(12) United States Patent
Neuber et al.

(10) Patent No.: US 8,822,044 B2
(45) Date of Patent: Sep. 2, 2014

(54) CERAMIC MATERIAL, METHOD FOR THE MANUFACTURE OF A CERAMIC MATERIAL AND ELECTROCERAMIC COMPONENT COMPRISING THE CERAMIC MATERIAL

(75) Inventors: Danilo Neuber, Graz (AT); Adalbert Feltz, Deutschlandsberg (AT)

(73) Assignee: EPCOS AG, Munich (DE)

( * ) Notice: Subject to any disclaimer, the term of this patent is extended or adjusted under 35 U.S.C. 154(b) by 99 days.

(21) Appl. No.: 13/063,299

(22) PCT Filed: Sep. 11, 2009

(86) PCT No.: PCT/EP2009/061818
§ 371 (c)(1),
(2), (4) Date: Mar. 29, 2011

(87) PCT Pub. No.: WO2010/029156
PCT Pub. Date: Mar. 18, 2010

(65) Prior Publication Data
US 2011/0169600 A1    Jul. 14, 2011

(30) Foreign Application Priority Data

Sep. 12, 2008 (DE) .......... 10 2008 046 858

(51) Int. Cl.
C04B 35/457 (2006.01)
C04B 35/50 (2006.01)
H01C 7/13 (2006.01)
H01C 7/00 (2006.01)
C04B 35/44 (2006.01)
H01C 17/065 (2006.01)
C04B 35/626 (2006.01)

(52) U.S. Cl.
CPC .......... *C04B 35/44* (2013.01); *C04B 2235/3272* (2013.01); *C04B 2235/3265* (2013.01); *H01C 7/008* (2013.01); *C04B 2235/3225* (2013.01); *C04B 2235/5445* (2013.01); *C04B 2235/768* (2013.01); *C04B 2235/762* (2013.01); *C04B 2235/5436* (2013.01); *C04B 2235/3208* (2013.01); *H01C 17/06533* (2013.01); *C04B 35/6262* (2013.01); *C04B 2235/3267* (2013.01); *C04B 2235/3241* (2013.01)
USPC ........... 428/701; 428/702; 501/134; 501/152; 501/135; 338/22 R

(58) Field of Classification Search
None
See application file for complete search history.

(56) References Cited

U.S. PATENT DOCUMENTS 3,441,517 A * 4/1969 Brauer et al. .............. 252/520.1
4,045,375 A    8/1977 Komatu
4,229,322 A   10/1980 Marchant et al.
5,764,129 A    6/1998 Syouji et al.
(Continued)

FOREIGN PATENT DOCUMENTS

CN    1138204        12/1996
DE    26 10 699       1/1977
(Continued)

OTHER PUBLICATIONS

International Search Report dated Nov. 23, 2009.

*Primary Examiner* — Vera Katz
(74) *Attorney, Agent, or Firm* — Cozen O'Connor

(57) ABSTRACT

Ceramic material of the general formula: $[SE_{1-x}M^{II}_x][Cr_{1-y-z}R_yL_z]O_3$, wherein SE stands for one or more rare earth metals, $M^{II}$ stands for one or more metals of the oxidation state +II, L stands for Al and/or Ga, R stands for one or more metals selected from Fe, Zn, Ge, Sn, and it holds that: $0<x<1$; $0<y<1$; $0.5<z<1$; $y+z<1$.

13 Claims, 1 Drawing Sheet

(56) References Cited

U.S. PATENT DOCUMENTS

| | | |
|---|---|---|
| 2004/0159825 A1* | 8/2004 | Chosokabe et al. ........ 252/500 |
| 2007/0059928 A1* | 3/2007 | Harutyunyan ............. 438/679 |
| 2009/0016409 A1* | 1/2009 | Mizoguchi et al. ......... 374/185 |
| 2010/0055497 A1 | 3/2010 | Cernoch et al. |

FOREIGN PATENT DOCUMENTS

| | | | |
|---|---|---|---|
| DE | 19832843 | | 10/1996 |
| DE | 10200712468 | | 9/2008 |
| EP | 0626356 | | 8/1999 |
| EP | 1 775 274 | | 4/2006 |
| EP | 1775274 | * | 4/2007 |
| JP | 07-099103 | | 4/1995 |
| JP | 2003-183075 | | 7/2003 |
| JP | 2006054258 | | 2/2006 |
| JP | 2007-246381 | | 9/2007 |
| JP | 2008-098452 | | 4/2008 |
| WO | WO2006109792 | * | 10/2006 |

* cited by examiner

CERAMIC MATERIAL, METHOD FOR THE MANUFACTURE OF A CERAMIC MATERIAL AND ELECTROCERAMIC COMPONENT COMPRISING THE CERAMIC MATERIAL

PRIORITY CLAIM

This is a U.S. national stage of application No. PCT/EP2009/061818, filed on Sep. 11, 2009. Priority is claimed on the following application: German Application No.: 10 2008 046 858.4 filed on Sep. 12, 2008, the content of which is incorporated here by reference.

BACKGROUND OF THE INVENTION

A widespread problem of ceramic materials that are used as NTC thermistors is that the resistances of the ceramic materials have a B constant which, although it meets the requirements for thermistor sensitivity, assumes a value in the high temperature range that leads to resistance values too low in practice to be measured by measuring instruments.

An NTC thermistor is understood as meaning a current-conducting material that conducts the current better at higher temperatures than at lower temperatures. The resistance of the material decreases with increasing temperatures. These materials therefore have a negative temperature coefficient, which is why they are referred to as NTC materials. For an NTC material, or an electroceramic component that comprises such a material, a characteristic curve can be determined. This can be described by the Arrhenius relationship, which is as follows:

$$R_T = R_N \exp[B*(1/T - 1/T_N)] \text{ or } \rho_T = \rho_N \exp[B*(1/T - 1/T_N)]$$

wherein $R_T$ stands for the resistance and $\rho_T$ stands for the resistivity at the temperature T. $R_N$ stands for the resistance at an agreed nominal temperature $T_N$, for example $T_N = 25°$ C. The B constant corresponds to the quotient $E_A/k$, wherein $E_A$ is the thermal activation energy and k is the Boltzmann constant. $R_T$ is linked to $\rho_T$ by the geometry factor according to $R_T = \rho_T * L_k/A_k$, wherein $A_k$ stands for the contacted area of a plane-parallel test piece and $L_k$ stands for the distance between the contacted areas. The thermal activation energy indicates the activation energy for the conduction of polarons and is generally related to a specific temperature interval, for example for $B_{25/100° C.}$ to the interval from 25 to 100° C.

Polarons are understood as the coupling of electronic charge carriers with lattice vibrations, the phonons, the linkage of which is referred to in theory as quasiparticles.

The B constant is also a measure of the temperature-dependent sensitivity α, which indicates the change in the resistance of an electroceramic component in dependence on the temperature:

$$\alpha = 1/\rho_T (d\rho_T/dT) = -B/T^2$$

SUMMARY OF THE INVENTION

One object of the embodiments of the invention is to provide a ceramic material for a temperature measurement in the temperature range from room temperature (~25° C.) to 1000° C. that has high long-term stability.

The object is achieved by a ceramic material according to the embodiments disclosed herein. Further embodiments of the ceramic material, and an electroceramic component which comprises the ceramic material are the subject of further claims. Furthermore, a method for the manufacture of a ceramic material is claimed.

BRIEF DESCRIPTION OF THE DRAWINGS

Exemplary embodiments of the invention are explained below on the basis of figures.

FIG. 1 shows in the Arrhenius plot the characteristic curve of the resistivity ρ in Ωcm between 300° C. and 1000° C. for the exemplary embodiments A to F, according to the invention, and for the examples not according to the invention, which in the case of G likewise have only one redox pair $Cr^{III}/Cr^{IV}$, and the specimen H, not according to the invention, which also additionally comprises the redox pair $Mn^{III}/Mn^{IV}$. Here, the variable 1000/T is plotted against the logarithm of the resistivity ρ, where T denotes the absolute temperature in kelvins. For orientation, a further scale is indicated on the upper side, with auxiliary lines being drawn from it into the diagram. This scale is a temperature scale, which indicates the temperature in ° C.

The resistance-temperature characteristic curve shows for the exemplary embodiments A to F, according to the invention, the desired flat path, while at the same time ensuring a still sufficient sensitivity and at the same time compliance with the set requirements and the long-term stability and aging stability. This can be seen from Tables 2a-c and 3a-c.

The characteristic curves show that the specimen H, not according to the invention, is not suitable for a technical application as NTC materials in a temperature range from 25° C. to 1000° C. because of the great steepness of the curve (comparatively high B constant): the resistance at room temperature is orders of magnitude above values of $10^6$ Ωcm, which are the values considered appropriate for practical application.

Figure 1:
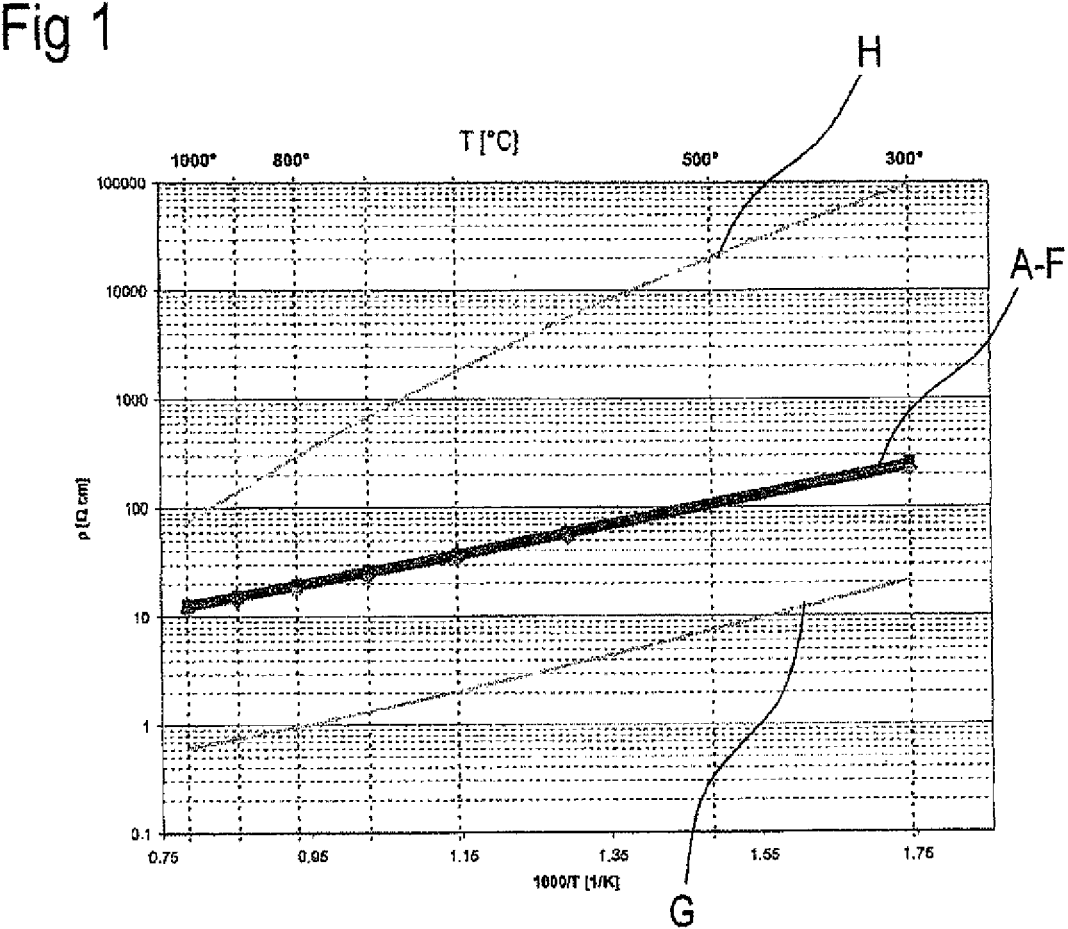
FIG. 1 shows an Arrhenius plot of the characteristic curve for the ceramics A to F, according to the invention, and for specimens of the compounds G and H, not according to the invention.

It can be seen from FIG. 1 that the specimen of the ceramic H, not according to the invention, has a greater steepness of the characteristic curve (and consequently a greater B value) in the range between 800 and 1000° C. than in the range from 300 to 500° C., which leads to resistances that are too high for a thermistor application up to room temperature; the resistivity of the ceramic specimen H at 25° C. was more than $10^8$ Ωcm. Although the ceramic specimen G, not according to the invention, shows a linear path, which suggests the exclusive presence of $Fe^{III}$, the resistance is further decreased by the substitution of Al by Fe, so that the requirement for a resistivity of several tens of Ωcm cannot be met. As the comparison of the values for the two compounds B and D in Table 1 and Tables 2 and 3 shows, the ceramics according to the invention, on the other hand, are characterized by a B constant that remains largely the same throughout the entire temperature range between 25 and 1000° C. It proves to be constant within an acceptable tolerance during the cyclical heating up and down after the first cycle.

Figure 2:
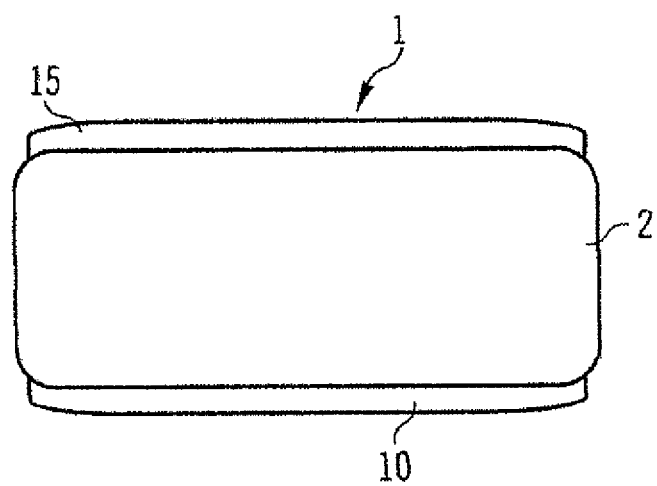
FIG. 2 shows a schematic side view of one embodiment of the electroceramic component.

FIG. 2 shows a schematic side view of one embodiment of the electroceramic component 1. This comprises a ceramic base body 2, on the underside of which a first electrically conductive contact area 10 is arranged and on the upper side of which a second electrically conductive contact area 15 is arranged.

DETAILED DESCRIPTION OF THE PRESENTLY PREFERRED EMBODIMENTS

One embodiment of the invention concerns a ceramic material of the general formula:

wherein SE stands for one or more rare earth metals, $M^{II}$ stands for one or more metals of the oxidation state +II, L stands for Al and/or Ga, R stands for one or more metals selected from Fe, Zn, Ge and Sn, and it holds that: $0<x<1$; $0<y<1$; $0.5<z<1$; $y+z<1$.

The ceramic material can be described by the general formula $ABO_3$, wherein SE and $M^{II}$ are arranged at the A sites and Cr, L and R are arranged at the B sites. The resistance of the ceramic material is set by suitable combination of these constituents. The setting of the resistance can be performed by "diluting" the Cr by the incorporation of L and additionally R at the B sites of the ceramic. The elements chosen for R and L preferably have a charge transfer indifference, i.e. they are fixed at an oxidation state in the crystal lattice of the ceramic material. Cr, on the other hand, can change its oxidation states. The charge transfer is restricted throughout the entire temperature range to the polaron site-interchange processes of Cr.

In a further embodiment, R stands for precisely two metals $R^1$ and $R^2$, giving rise to the general formula:

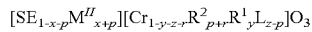

$$[SE_{1-x-p}M^{II}_{x+p}][Cr_{1-y-z-r}R^2_{p+r}R^1_y L_{z-p}]O_3$$

for p and r it holds that: $0.001<p<0.05$ and $r=0$ if $R^2=R^{2\,IV}$ is a redox-stable cation of the oxidation state IV, and otherwise $0.001<r<0.05$ and $p=0$ if $R^2=R^{2\,II}$ is a redox-stable cation of the oxidation state II. For the case where $p=0$, an increase in the $Cr^{IV}$ concentration can be achieved by introduction of redox-stable cations $R^2$ of the oxidation state II, for example of $Zn^{II}$ at the B sites of the perovskite structure. In this process, a fine setting of the concentration of charge carrier centers (polarons) and their activation energy can be achieved without introduction of one or more further transition metal cations with changing valence. As a result, an increase in the conductivity is achieved, which however can be partially compensated or even overcompensated as a result of greater fluctuations in the lattice potential and an associated increase in the B constant, which leads to an increase in resistance and corresponds to the formula $$[SE_{1-x}M^{II}_x][Cr^{III}_{1-x-y-z-2r}Cr^{IV}_{x+r}Zn^{II}_r R^1_y L_z]O_3$$

or in that, according to the formula $$[SE_{1-x-p}M^{II}_{x+p}][Cr^{III}_{1-x-y-z}Cr^{IV}_x R^{2IV}_p R^1_y L_{z-p}]O_3$$

$r=0$, with $R^2=R^{2\,IV}=Ge$ and/or Sn, the polaron concentration bound to the $Cr^{III}/Cr^{IV}$ ratio is kept constant. As a result, an increase in resistance is brought about just by greater irregularity in the distribution of the potential energy at the charge carrier centers (polarons), and consequently of the B constant, caused by the partial incorporation of tetravalent Ge and/or Sn in place of the trivalent cations R and L, for example L=Al.

Here, SE stands for one or more rare earth metals, $M^{II}$ stands for one or more metals of the oxidation stage +II, L stands for Al and/or Ga, R stands for one or more metals apart from Cr, Al, Ga, Mn and $R^2=Zn^{II}$ for $p=0$ and $R^{2\,IV}=Ge$ and/or Sn for $r=0$, and it holds that: $0<x<1$; $0\leq y<1$; $0.5<z<1$; $0.05<1-y-z<1$ and $0.001<r<0.05$ in the case where $p=0$ and $0.001<p<0.05$ in the case where $r=0$.

The ceramic material can be described by the general formula $ABO_3$, where SE and $ME^{II}$ are arranged at the A sites and Cr, L, Zn or Ge and/or Sn and R, if present, are arranged at the B sites. The resistance of the ceramic material is set by suitable combination of these constituents. The setting of the resistance can be performed by "diluting" the Cr by the incorporation of L and possibly additionally also R as well as $R^2=Zn^{II}$ or $Ge^{IV}$ and/or $Sn^{IV}$ at the B sites of the ceramic. The elements chosen for R and L and $R^2$ preferably have a charge transfer indifference, i.e. they are fixed at one oxidation state in the crystal lattice of the ceramic material. Cr, on the other hand, can change its oxidation states. The charge transfer is restricted throughout the entire temperature range to the polaron site-interchange processes of Cr. In addition to the dilution effect, $Zn^{II}$ and $R^{2\,IV}=Ge$, Sn contribute to increasing the B constant as a result of broadening of the fluctuations of the lattice potential, avoiding the introduction of further transition metal cations with mixed valence, which at high temperature would contribute disadvantageously to the charge transfer.

In a further embodiment of the invention, SE stands for one or more elements selected from Y, Ce, Sm, Eu, Gd, Tb, Dy, Ho, Er, Yb, Lu. Y is preferred here.

These rare earth metals are all distinguished by the fact that they are stable in the oxidation state +III. Rare earth metals are understood in connection with this invention as meaning the elements with the atomic numbers 39 and 57-71.

In a further embodiment of the invention, SE stands for precisely one rare earth metal.

In a further embodiment of the invention, $M^{II}$ stands for one or more elements selected from: Mg, Ca, Sr. Ca and Sr are preferred here. The elements Mg, Ca and Sr are in the oxidation state +II. For ceramic materials with Ca and/or Sr as $M^{II}$, it has been possible in combination with L=Al and/or Ga and by adding Zn or Ge and/or Sn to achieve very good values for the resistance and the B constant, including a high aging stability.

In a further embodiment of the invention, $M^{II}$ stands for precisely one element.

For ceramic materials in which either Ca or Sr has been chosen as $M^{II}$, it has been possible in combination with L=Al and/or Ga and by adding Zn or Ge and/or Sn to achieve very good values for the resistance and the B constant as well as a high aging stability.

In a further embodiment of the invention, R stands for Fe, or a combination of metals that comprises Fe. For ceramic materials with Fe as R, it has been possible in combination with L=Al and/or Ga and possibly by adding Zn or Ge and/or Sn to achieve very good values for the resistance and the B constant as well as a high aging stability.

In a further embodiment of the invention, R stands for Zn, or a combination of metals that comprises Zn. In a further embodiment of the invention, R stands for Ge, or a combination of metals that comprises Ge.

In a further embodiment of the invention, R stands for Sn, or a combination of metals that comprises Sn.

The inventors have recognized that a ceramic material can be provided for temperature measurement in the temperature range from room temperature (~25° C.) to 1000° C. with high long-term stability if just one element with mixed valence, for example $Cr^{III}/Cr^{IV}$, takes part in the conduction mechanism and no further redox pairs, such as for example $Mn^{III}/Mn^{IV}$, are used. As a result, a consistent, virtually constant B value is obtained over the entire temperature range; the resistance can then be set by partial substitution of Cr by a redox-stable cation such as $Al^{III}$ or $Ga^{III}$ and adjusted to specific values by additional incorporation of the likewise redox-stable cations of Zn or Ge and/or Sn at the B sites of the perovskite lattice; however, the coefficient z must be $>0.5$ in order to meet the resistance requirements. This avoids the incorporation of a number of different transition metal cations with mixed valence and at the same time ensures sufficient variation in the lattice potential for setting a sufficiently great B constant.

The ceramic material can be described by the general formula $ABO_3$ of the perovskite structure type, wherein $SE^{III}$ and $M^{II}$ are arranged at the A sites and Cr, L and possibly R as well as Zn or Ge and/or Sn are arranged at the B sites. By incorporation of the divalent cations $M^{II}$ at A sites, the principle of directed valence is used to induce the formation at the B sites of $Cr^{IV}$, which together with $Cr^{III}$ form a redox pair, so that a high polaron conductivity occurs. Since only neighboring $Cr^{III}/Cr^{IV}$ pairs take part in the electrical conduction, the resistivity can be set by the incorporation of redox-stable cations L ($Al^{III}$ or $Ga^{III}$) at the B sites of the perovskite lattice, which "dilute" the concentration of the polarons, a fine setting being additionally accomplished by the incorporation of Zn or Ge and/or Sn. The elements $Al^{III}$ and/or $Ga^{III}$ as well as the insertion of $Zn^{II}$ or $Ge^{IV}$ and/or $Sn^{IV}$ and similarly the rare earth metals $SE^{III}$ and the metals $M^{II}$ incorporated at the A sites are fixed at an oxidation state of +III or +II or +IV, and therefore do not contribute to polaron site-interchange processes.

With $Y^{III}$ for $SE^{III}$ and $Ca^{II}$ for $M^{II}$, in combination with L=Al and/or Ga and by adding Zn or Ge and/or Sn, very good values were achieved for the resistance and the B constant.

In a further embodiment, R stands for precisely one metal selected from Fe, Zn, Ge, Sn.

In a further embodiment of the invention, $SE^{III}$ stands for precisely one rare earth metal of the oxidation state +III. For the choice of $Fe^{III}$ as $R^{III}$, the bending away of the resistance-temperature characteristic curve in the direction of a steeper path that commences in the range from 400 to 500° C., i.e. as the B constant becomes greater, is not observed. It can be concluded from this that $Fe^{III}$ is redox-stable under the required conditions. Consequently, Cr is the only constituent that is present in two different oxidation states. The polaron site-interchange process is consequently restricted to the Cr. The principle of directed valence is used to control the proportion of $Cr^{IV}$ in the ceramic material by way of the proportion of $M^{II}$ and is finely adjusted by adding Zn. The Cr that is present in the starting raw material mixture as $Cr^{III}$ is oxidized during the preparation of the ceramic by the atmospheric oxygen.

In a further embodiment of the invention, it holds for the parameter x that: $0.03 \leq x \leq 0.5$, wherein the range $0.05 < x < 0.25$ is preferred.

In a further embodiment of the invention, it holds for the parameter y that: $0 < y < 0.5$, wherein the range $0.005 < y < 0.25$ is preferred.

In a further embodiment of the invention, it holds for the parameter z that: $0.5 < z < 0.9$, wherein the range $0.70 < z < 0.90$ is preferred.

In a further embodiment of the invention, it holds for the parameters y and z that: $0.05 < (1-y-z) < 0.25$, wherein the range $0.10 < (1-y-z) < 0.20$ is preferred.

In a further embodiment of the invention, it holds for the parameters p and r that: $0.001 < r < 0.05$ in the case where p=0 and $0.001 < p < 0.05$ in the case where r=0.

For ceramic materials with these parameters, it has been possible to achieve very good values for the resistance and the B constant.

In a further embodiment of the invention, the ceramic material is formed as a phase-homogeneous perovskite solid-solution system of the general formula $ABO_3$.

The crystal structure of perovskite can be described in two different ways.

The B atoms are respectively surrounded by six oxygen atoms in the form of octahedrons. These $[BO_6]$ octahedrons form a three-dimensional network by way of common corners. In the gaps of this network are the A atoms, which have a coordination sphere of twelve oxygen atoms in the form of a cubocta-hedron as the coordination polyhedron.

Alternatively, the structure may also be described as a face-centered cubic crystal structure, which is constructed from A atoms together with oxygen. Every fourth octahedron gap of the crystal structure is in this case occupied by B atoms.

The ceramic material may be an NTC thermistor material, that is to say a conducting material that conducts current better at high temperatures than at low temperatures. The resistance of the material therefore decreases with increasing temperatures.

The polaron site-interchange process takes place by way of so-called "hopping" between different oxidation states of non-redox-stable transition metal cations. If, along with $CR^{III}/Cr^{IV}$, there is also a further non-redox-stable element E in the oxidation states +III and +IV, the hopping could take place not only between $Cr^{III}/Cr^{IV}$ and $E^{III}/E^{IV}$ but also between $E^{III}/Cr^{IV}$ or $Cr^{III}/E^{IV}$. By limiting the hopping to one element, in this case Cr, the average hopping distance increases, which leads to a decrease in the current paths and an increase in the resistance. The inventors have recognized that the presence of a further non-redox-stable element E that can contribute to the polaron hopping would have the effect that, for example for Mn as E, in the range from 400° C. to 500° C. the resistance-temperature characteristic curve would assume a steeper path, and there would consequently be a greater B constant. This would have the consequence that, if the resistance at room temperature were not set to more than $\approx 10^6$ $\Omega$cm, at 1000° C. there would be a resistance value too low for temperature measurement, for example of only several $\Omega$cm. By preventing additional hopping paths by omitting further non-redox-stable metals apart from the Cr, the steep path of the resistance-temperature characteristic curve can be prevented in this temperature range, which has the effect that the desired resistance of at least several tens of $\Omega$cm is then achieved at 1000° C. even when the resistance at room temperature is set to no more than $\approx 10^6$ $\Omega$cm.

An essential inventive step in the case of some embodiments of the invention lies in the recognition that the presence of several different redox pairs, for example of $Cr^{III}$ and $Cr^{IV}$ along with, for example, $Mn^{III}$ and $Mn^{IV}$, is responsible for an additional activation of polaron site-interchange processes, from $Cr^{III}$ to $Mn^{IV}$ or from $Mn^{III}$ to $Cr^{IV}$, which commences in the range from 400 to 500° C. and brings about a bending away of the resistance-temperature characteristic curve in the direction of a steeper path, i.e. as the B constant becomes greater. At 1000° C., this results in resistance values that are too low for temperature measurement, of only several $\Omega$cm, if the resistance at room temperature is set to no more than about $10^6$ $\Omega$cm.

Logically, the restriction to only one redox pair, for example $Cr^{III}$ and $Cr^{IV}$, as a basis for a polaron transfer process in a perovskite solid-solution system of the stated compositions according to the formulas goes together with avoiding entry into a steeper path by the resistance-temperature characteristic curve in the high temperature range, so that the desired electrical resistance of at least several tens of $\Omega$cm at 1000° C. can be maintained even when the resistance at room temperature has been set to no more than about $10^6$ $\Omega$cm.

The essence of embodiments of the invention is that, while preserving long-term stability and aging stability up to 1000° C. in conformity with the set requirements, a flatter path of the resistance-temperature characteristic curve in the perovskite solid-solution system $ABO_3$ is brought about by exclusion of a second redox pair, the contribution of a second redox pair to the variation in potential energy at the lattice sites of the polarons being taken over by the addition of $Zn^{II}$ or $Ge^{IV}$ and/or $Sn^{IV}$ and, as a result, a still sufficient sensitivity of the temperature measurement being retained.

Apart from the ceramic material itself, a method for the manufacture of the ceramic material is also claimed.

A variant of the method for the manufacture of a ceramic material according to one of the embodiments described above comprises the method steps of: A) mixing the following compounds: $SE_2O_3$, $M^{II}CO_3$, $Cr_2O_3$, $L_2O_3$ and an oxide of R, so that a mixture is obtained, B) sintering the mixture produced under A).

In a first method step A), the starting materials $SE_2O_3$, $M^{II}CO_3$, $Cr_2O_3$, $L_2O_3$ and the oxide of R are mixed. Cr is at the same time added as $Cr_2O_3$, that is to say in a compound in which it is present as $Cr^{III}$. Only in the second method step B), the sintering, with the other starting materials, also including $M^{II}CO_3$, is $Cr^{III}$ oxidized, controlled by the content of $M^{II}$, by the atmospheric oxygen to an equivalent part in relation to $Cr^{IV}$. Consequently, charge neutrality (equivalence of the positive cation charges and the negative oxide ion charges) is achieved in the sintered perovskite solid-solution system.

In a further method variant, the starting substances are precipitated from an aqueous phase, dried and subsequently sintered.

In a further method variant, the mixture of the starting materials is also calcined before method step B). The temperature for the calcining lies here between 1000° C. and 1300° C., the range between 1050° C. and 1200° C. being preferred.

In a further method variant, the calcined material is also ground before method step B). The grains obtained by the grinding may have here a grain size $d_{50}$ of approximately 1 micrometer. The grain size $d_{50}$ indicates the size that approximately 50% of the grains have.

In a further method variant, the previously described grinding is also followed by a fine grinding step. After that, the grain size $d_{50}$ may lie in a range from 0.3 to 1 micrometer.

In a further method variant, a phase-homogeneous perovskite solid-solution system is formed by the sintering in method step B). This represents a standard phase, which can be described by the general formula $ABO_3$.

In a further method variant, the sintering in method step B) is performed at a temperature from 1400° C. to 1600° C., a temperature range from 1550° C. to 1600° C. being preferred to achieve a sufficient sintering compaction of at least 90% of the theoretical density.

Apart from the ceramic material, an electroceramic component that comprises the ceramic material is also claimed.

One embodiment of the component comprises a ceramic material according to one of the embodiments described above.

In a further embodiment of the component, it comprises a base body, which comprises a ceramic material according to one of the embodiments described above, and electrically conductive contacting pads on the surface of the base body. The electrical conductive contacting pads may, for example, comprise platinum.

One embodiment of the component may be designed here in such a way that it is suitable for temperature measurement.

Since the ceramic material may be an NTC material, it is suitable, for example, for use in temperature sensors. The component may consequently be designed, for example, as a thermistor. This thermistor may be used, for example, for temperature measurements in temperature ranges up to 1000° C. The component may be formed, for example, in such a way that it is suitable as an exhaust gas sensor for internal combustion engines, particle filters or catalytic converters.

Thermistors that comprise a ceramic material according to the invention have no or only a reduced drift over time of the characteristic curve and are consequently sufficiently stable in terms of aging even at higher temperatures. At the same time, they have resistances that are advantageous for measuring instruments, at room temperature of <$10^6$ Ωcm and at 1000° C. of several tens of Ωcm, without the B constant, and consequently at the same time the sensitivity, being reduced too much.

The eight different ceramic materials A to H are considered below, the ceramic materials A to F concerning embodiments of a ceramic material according to the invention, whereas the ceramic materials G and H are comparative examples that are not according to the invention:

A $[Y_{0.95}Ca_{0.05}][Cr^{III}_{0.09}Cr^{IV}_{0.055}Zn^{II}_{0.005}Al^{III}_{0.85}]O_3$
B $[Y_{0.95}Ca_{0.05}][Cr^{III}_{0.08}Cr^{IV}_{0.06}Zn^{II}_{0.01}Al^{III}_{0.85}]O_3$
C $[Y_{0.945}Ca_{0.055}][Cr^{III}_{0.10}Cr^{IV}_{0.05}Ge^{IV}_{0.005}Al^{III}_{0.845}]O_3$
D $[Y_{0.94}Ca_{0.06}][Cr^{III}_{0.10}Cr^{IV}_{0.05}Ge^{IV}_{0.01}Al^{III}_{0.845}]O_3$
E $[Y_{0.945}Ca_{0.055}][Cr^{III}_{0.10}Cr^{IV}_{0.05}Sn^{IV}_{0.005}Al^{III}_{0.84}]O_3$
F $[Y_{0.94}Ca_{0.06}][Cr^{III}_{0.10}Cr^{IV}_{0.05}Sn^{IV}_{0.01}Al^{III}_{0.84}]O_3$
G: $[Y_{0.97}Ca_{0.03}][Cr^{III}_{0.12}Cr^{IV}_{0.03}Fe^{III}_{0.85}]O_3$
H: $[Y_{0.97}Ca_{0.03}][Cr^{III}_{0.12}Cr^{IV}_{0.03}Mn^{III}_{0.085}Al^{III}_{0.765}]O_3$ or $[Y_{0.97}Ca_{0.03}][Cr^{III}_{0.15}Mn^{IV}_{0.03}Mn^{III}_{0.055}Al^{III}_{0.765}]O_3$

The composition H, which is not according to the invention, can be described here by two limiting structures, since Cr and Mn can reduce or oxidize reciprocally. There is consequently a transformation of the oxidation state +III to +IV of the one element in combination with the transformation from +IV to +III of the other of the two elements.

The compositions A to F, according to the invention, represent a ceramic material with a negative temperature coefficient, which with high thermal stability and aging stability up to 1000° C. at the same time meets the requirement for resistance values that are advantageous for measuring instruments of at most about $10^6$ Ωcm at room temperature and at least several tens of Ωcm at 1000° C., without the B constant, and therefore also the sensitivity, being reduced too much.

To prepare the powders of the ceramic materials, the following were respectively used (figures in % by weight):
A: 64.22% $Y_2O_3$, 3.00% $CaCO_3$, 6.60% $Cr_2O_3$, 0.24% ZnO, 25.94% $Al_2O_3$
B: 64.21% $Y_2O_3$, 3.00% $CaCO_3$, 6.37% $Cr_2O_3$, 0.49% ZnO, 25.94% $Al_2O_3$
C: 63.81% $Y_2O_3$, 3.29% $CaCO_3$, 6.82% $Cr_2O_3$, 0.31% $GeO_2$, 25.76% $Al_2O_3$
D: 63.40% $Y_2O_3$, 3.59% $CaCO_3$, 6.81% $Cr_2O_3$, 0.63% $GeO_2$, 25.38% $Al_2O_3$
E: 63.72% $Y_2O_3$, 3.29% $CaCO_3$, 6.81% $Cr_2O_3$, 0.45% $SnO_2$, 25.73% $Al_2O_3$
F: 63.22% $Y_2O_3$, 3.58% $CaCO_3$, 6.79% $Cr_2O_3$, 0.90% $SnO_2$, 25.51% $Al_2O_3$
G: 57.10% $Y_2O_3$, 1.57% $CaCO_3$, 5.94% $Cr_2O_3$, 35.39% $Fe_2O_3$
H: 64.56% $Y_2O_3$, 1.77% $CaCO_3$, 6.72% $Cr_2O_3$, 22.99% $Al_2O_3$, 3.96% $Mn_2O_3$ The respective starting materials were weighed in with 200 to 300 g of deionized water and pre-ground. After drying, the first calcining of the powder was performed for four hours at 1050° C. to 1150° C. The then following main grinding of the aqueous suspension was performed with yttrium-stabilized zirconium beads, achieving a target size $d_{50}$ of less than 1.5 μm. After renewed drying and second calcining of the powder at 1100° C. to 1200° C. for four hours, fine grinding was performed to a grain size $d_{50}$ of less than 0.8 μm.

To produce test pieces, the ceramic powder was mixed with a binder and transformed into a slurry, and this was processed by spraying to form pourable press granules for the purpose of subsequently producing disk-shaped compacts or was fed to a calendering process in order to produce wafers after lamination.

The electrical connection to the NTC ceramic is performed by applying a Pt paste as an electrical contact area by screen printing to the two main surfaces of the disk-shaped specimen or the wafer. After that, co-sintering is used both to burn the electrical contact areas into the ceramic base body and to sinter the ceramic material. The sintering is performed after customary debinding at up to 1600° C., with a holding time of 1 to 3 hours.

The resistance of the NTC components manufacture in this way is assessed by resistance measurements in stable temperature ranges and the electrical aging drifts cue documented during periods of being kept under appropriate high-temperature conditions and by cyclically recording the characteristic curve up to 1000° C. To determine the electrical parameters, cylindrical ceramic specimens with a diameter of 5.5 mm and a height of in each case 1.5 mm were provided with electrically conductive platinum contact areas.

For the exemplary embodiments A to F, according to the invention, the values for the electrical properties $\rho_{25°\,C.}$, $B_{25/100°\,C.}$ and $B_{300/1000°\,C.}$ are given in Table 1.

TABLE 1

| Spec. | Composition | $\rho_{25°\,C.}$ [kΩ cm] | $B_{25/100}$ [K] | $B_{300/1000}$ [K] |
|---|---|---|---|---|
| A | $[Y_{0.95}Ca_{0.05}][Cr^{III}_{0.09}Cr^{IV}_{0.055}Zn^{II}_{0.005}Al^{III}_{0.85}]O_3$ | 32.4 | 2905 | 3063 |
| B | $[Y_{0.95}Ca_{0.05}][Cr^{III}_{0.08}Cr^{IV}_{0.06}Zn^{II}_{0.01}Al^{III}_{0.85}]O_3$ | 38.8 | 2934 | 3100 |
| C | $[Y_{0.945}Ca_{0.055}][Cr^{III}_{0.10}Cr^{IV}_{0.05}Ge^{IV}_{0.005}Al^{III}_{0.845}]O_3$ | 32.4 | 2943 | 3082 |
| D | $[Y_{0.94}Ca_{0.06}][Cr^{III}_{0.10}Cr^{IV}_{0.05}Ge^{IV}_{0.01}Al^{III}_{0.84}]O_3$ | 43.2 | 3013 | 3120 |
| E | $[Y_{0.945}Ca_{0.055}][Cr^{III}_{0.10}Cr^{IV}_{0.05}Sn^{IV}_{0.005}Al^{III}_{0.845}]O_3$ | 30.7 | 2926 | 3066 |
| F | $[Y_{0.94}Ca_{0.06}][Cr^{III}_{0.10}Cr^{IV}_{0.05}Sn^{IV}_{0.01}Al^{III}_{0.84}]O_3$ | 38.6 | 2968 | 3131 |
| G | $[Y_{0.97}Ca_{0.03}][Cr^{III}_{0.12}Cr^{IV}_{0.03}Fe^{III}_{0.85}]O_3$ | 3.3 | 2590 | 3688 |
| H | $[Y_{0.97}Ca_{0.03}][Cr^{III}_{0.12}Cr^{IV}_{0.03}Mn^{III}_{0.085}Al^{III}_{0.765}]O_3$ or $[Y_{0.97}Ca_{0.03}][Cr^{III}_{0.15}Mn^{IV}_{0.03}Mn^{III}_{0.055}Al^{III}_{0.765}]O_3$ | >$10^8$ | — | 7468 |

The resistances and B constants of the ceramic specimens B and D were respectively detected in three measuring cycles and the temperature profile compared in order to assess the aging stability. The measured values obtained are shown in Tables 2a-c for B and correspondingly in Tables 3a-c for D. The heating up and down was performed here in stages with waiting times of at least 30 minutes.

TABLE 2a specimen B $\rho_{T°\,C.}/\Omega\mathrm{cm}$: 1st cycle

| Temp.° C. | 300 | 500 | 800 | 1000 | 800 | 500 | 300 |
|---|---|---|---|---|---|---|---|
| $\rho_{specimen\,1}$ | 265.40 | 62.54 | 20.64 | 13.41 | 20.60 | 62.24 | 262.89 |
| $\rho_{specimen\,2}$ | 265.72 | 62.60 | 20.67 | 13.42 | 20.63 | 62.33 | 263.40 |
| Spec. 1 | $B_{300/1000°\,C.}$ = 3112 K | | | $B_{300/1000°\,C.}$ = 3102 K | | ΔB = −0.32% | |
| | | | | | | $\Delta\rho_{300°\,C.}$ = −1.0% | |
| Spec. 2 | $B_{300/1000°\,C.}$ = 3112 K | | | $B_{300/1000°\,C.}$ = 3103 K | | ΔB = −0.29% | |
| | | | | | | $\Delta\rho_{300°\,C.}$ = −0.9% | |

TABLE 2b specimen B $\rho_{T°\,C.}/\Omega\mathrm{cm}$: 2nd cycle

| Temp.° C. | 300 | 500 | 800 | 1000 | 800 | 500 | 300 |
|---|---|---|---|---|---|---|---|
| $\rho_{specimen\,1}$ | 262.89 | 62.24 | 20.60 | 13.40 | 20.58 | 62.12 | 262.02 |
| $\rho_{specimen\,2}$ | 263.40 | 62.33 | 20.62 | 13.41 | 20.61 | 62.21 | 262.50 |
| Spec. 1 | $B_{300/1000°\,C.}$ = 3103 K | | | $B_{300/1000°\,C.}$ = 3099 K | | ΔB = −0.11% | |
| | | | | | | $\Delta\rho_{300°\,C.}$ = −0.3% | |
| Spec. 2 | $B_{300/1000°\,C.}$ = 3104 K | | | $B_{300/1000°\,C.}$ = 3100 K | | ΔB = −0.11% | |
| | | | | | | $\Delta\rho_{300°\,C.}$ = −0.3% | |

TABLE 2c specimen B $\rho_{T°C}/\Omega$cm: 3rd cycle

| Temp.° C. | 300 | 500 | 800 | 1000 | 800 | 500 | 300 |
|---|---|---|---|---|---|---|---|
| $\rho_{specimen\ 1}$ | 262.02 | 62.12 | 20.58 | 13.40 | 20.56 | 62.04 | 261.47 |
| $\rho_{specimen\ 2}$ | 262.50 | 62.20 | 20.60 | 13.41 | 20.59 | 62.14 | 262.00 |
| Spec. 1 | $B_{300/1000°\ C.}$ = 3100 K | | | $B_{300/1000°\ C.}$ = 3101 K | | $\Delta B = -0.07\%$ | |
| | | | | | | $\Delta\rho_{300°\ C.} = -0.2\%$ | |
| Spec. 2 | $B_{300/1000°\ C.}$ = 3097 K | | | $B_{300/1000°\ C.}$ = 3099 K | | $\Delta B = -0.06\%$ | |
| | | | | | | $\Delta\rho_{300°\ C.} = -0.2\%$ | |

TABLE 3a specimen D $\rho_{T°C}/\Omega$cm: 1st cycle

| Temp.° C. | 300 | 500 | 800 | 1000 | 800 | 500 | 300 |
|---|---|---|---|---|---|---|---|
| $\rho_{specimen\ 1}$ | 258.95 | 59.99 | 19.65 | 12.70 | 19.60 | 59.65 | 256.11 |
| $\rho_{specimen\ 2}$ | 256.69 | 59.38 | 19.43 | 12.56 | 19.36 | 58.88 | 252.51 |
| Spec. 1 | $B_{300/1000°\ C.}$ = 3143 K | | | $B_{300/1000°\ C.}$ = 3131 K | | $\Delta B = -0.37\%$ | |
| | | | | | | $\Delta\rho_{300°\ C.} = -1.1\%$ | |
| Spec. 2 | $B_{300/1000°\ C.}$ = 3145 K | | | $B_{300/1000°\ C.}$ = 3128 K | | $\Delta B = -0.55\%$ | |
| | | | | | | $\Delta\rho_{300°\ C.} = -1.7\%$ | |

TABLE 3b specimen D $\rho_{T°C}/\Omega$cm: 2nd cycle

| Temp.° C. | 300 | 500 | 800 | 1000 | 800 | 500 | 300 |
|---|---|---|---|---|---|---|---|
| $\rho_{specimen\ 1}$ | 256.11 | 59.64 | 19.60 | 12.69 | 19.57 | 59.45 | 254.50 |
| $\rho_{specimen\ 2}$ | 252.51 | 58.87 | 19.36 | 12.54 | 19.32 | 58.63 | 250.48 |
| Spec. 1 | $B_{300/1000°\ C.}$ = 3132 K | | | $B_{300/1000°\ C.}$ = 3126 K | | $\Delta B = -0.21\%$ | |
| | | | | | | $\Delta\rho_{300°\ C.} = -0.6\%$ | |
| Spec. 2 | $B_{300/1000°\ C.}$ = 3130 K | | | $B_{300/1000°\ C.}$ = 3121 K | | $\Delta B = -0.27\%$ | |
| | | | | | | $\Delta\rho_{300°\ C.} = -0.8\%$ | |

TABLE 3c specimen D $\rho_{T°C}/\Omega$cm: 3rd cycle

| Temp.° C. | 300 | 500 | 800 | 1000 | 800 | 500 | 300 |
|---|---|---|---|---|---|---|---|
| $\rho_{specimen\ 1}$ | 254.50 | 59.45 | 19.56 | 12.68 | 19.55 | 59.34 | 253.54 |
| $\rho_{specimen\ 2}$ | 250.48 | 58.63 | 19.32 | 12.53 | 19.30 | 58.50 | 249.39 |
| Spec. 1 | $B_{300/1000°\ C.}$ = 3127 K | | | $B_{300/1000°\ C.}$ = 3123 K | | $\Delta B = -0.13\%$ | |
| | | | | | | $\Delta\rho_{300°\ C.} = -0.4\%$ | |
| Spec. 2 | $B_{300/1000°\ C.}$ = 3122 K | | | $B_{300/1000°\ C.}$ = 3118 K | | $\Delta B = -0.15\%$ | |
| | | | | | | $\Delta\rho_{300°\ C.} = -0.4\%$ | |

It can be seen from the tables that the greatest changes for $B_{300/1000}$ and $\rho_{300}$ ($\Delta B$ and $\Delta\rho$) occur in the 1st cycle, but after that they then decrease, which suggests a necessary pre-aging. The results show that the initially established drift can be eliminated by suitable pre-aging, possibly carried out cyclically.

LIST OF REFERENCES

1 component
2 ceramic base body
10 first electrically conductive contact areas
15 second electrically conductive contact areas
A-F characteristic curve for ceramics according to the invention
G, H characteristic curve for ceramics not according to the invention.

The invention claimed is:

1. A ceramic material of the general formula:

wherein SE stands for one or more rare earth metals, $M^{II}$ stands for one or more metals of the oxidation state +II, L stands for Al and/or Ga, R stands for one or more metals selected from Fe, Zn, Ge, Sn, and $0<x<1$; $0<y<0.5$; $0.5<z<0.9$; further wherein $0.1<1-y-z<0.2$.

2. The ceramic material according to claim 1, wherein SE stands for one or more elements selected from: Y, Ce, Sm, Eu, Gd, Tb, Dy, Ho, Er, Yb, and Lu.

3. The ceramic material according to claim 1, wherein $M^{II}$ stands for one or more elements selected from the group consisting of Mg, Ca, Sr, and Ba.

4. The ceramic material according to claim 1, wherein R stands for Fe, or a combination of metals that comprises Fe.

5. The ceramic material according to claim 1, wherein R stands for Zn, or a combination of metals that comprises Zn.

6. The ceramic material according to claim 1, wherein R stands for Ge, or a combination of metals that comprises Ge.

7. The ceramic material according to claim 1, wherein R stands for Sn, or a combination of metals that comprises Sn.

8. The ceramic material according to claim 1, wherein x is: $0.03 \leq x \leq 0.5$.

9. The ceramic material according to claim 1, formed as a phase-homogeneous perovskite solid-solution system of the general formula $ABO_3$.

10. The ceramic material according to claim 1, wherein the ceramic material has a negative temperature coefficient.

11. A method for the manufacture of a ceramic material comprising the steps of:
   A) mixing the following compounds: $SE_2O_3$, $M^{II}CO_3$, $Cr_2O_3$, $L_2O_3$ and an oxide of R, so that a mixture is obtained,
   B) sintering the mixture produced under A) to form a ceramic material according to claim 1.

12. An electroceramic component comprising a ceramic material according to claim 1.

13. The electroceramic component according to claim 12, comprising:
   a ceramic base body containing the ceramic material, and,
   two electrically conductive contact areas arranged on the surface of the ceramic base body.

* * * * *